No. 799,859. PATENTED SEPT. 19, 1905.
F. A. MAGOWAN.
VEHICLE TIRE.
APPLICATION FILED JUNE 6, 1905.
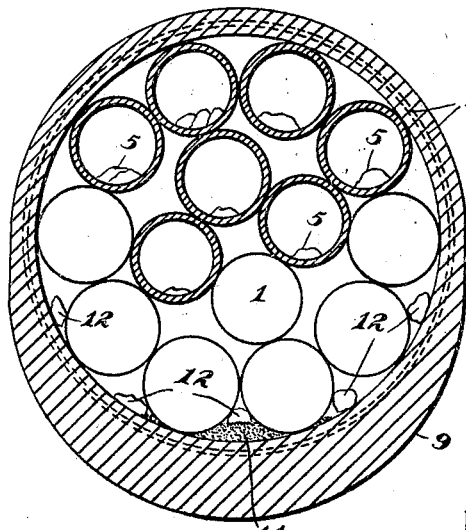
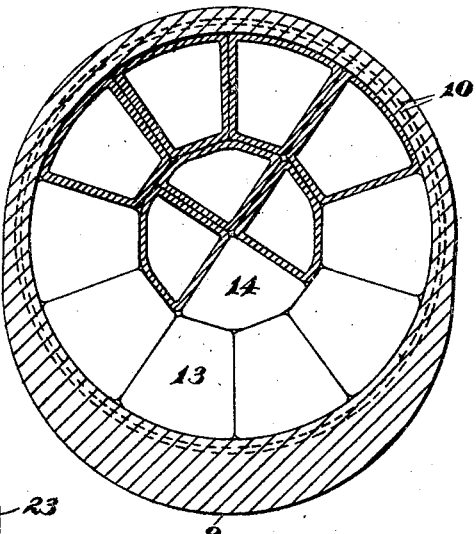
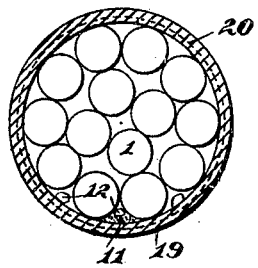
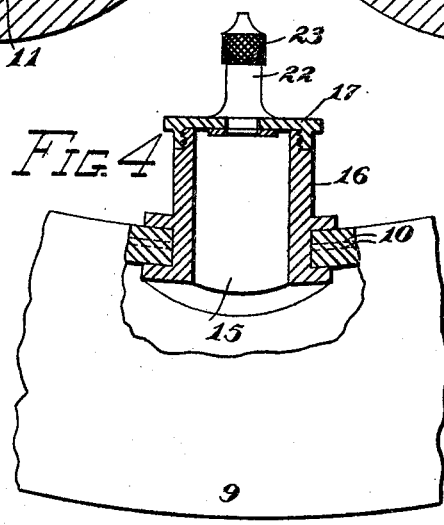
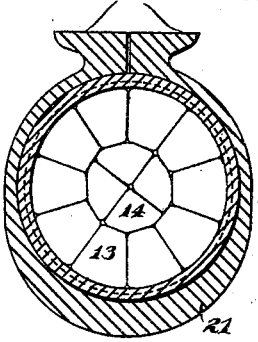
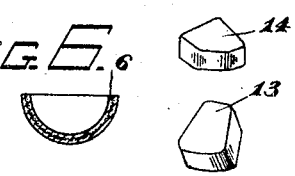
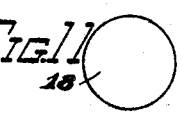
WITNESSES:
William M. Hilbert
Bertha Lehner
INVENTOR
Frank A. Magowan
BY
B. C. Stickney
ATTORNEY

UNITED STATES PATENT OFFICE.

FRANK A. MAGOWAN, OF TRENTON, NEW JERSEY.

VEHICLE-TIRE.

No. 799,859.  Specification of Letters Patent.  Patented Sept. 19, 1905.

Application filed June 6, 1905. Serial No. 264,002.

*To all whom it may concern:*

Be it known that I, FRANK A. MAGOWAN, a citizen of the United States, residing in Trenton, in the county of Mercer and State of New Jersey, have invented certain new and useful Improvements in Vehicle-Tires, of which the following is a specification.

This invention relates to rubber or flexible tires for automobiles and other vehicles; and its object is to produce a tire which shall be equal or superior in point of resiliency to the ordinary pneumatic tire and so far proof against deflation or loss of resiliency by puncturing that the tire will retain its resiliency until worn out even though suffering many punctures.

In the preferred manner of carrying out my invention I fill a "hose-pipe" tire or an inner tube with a mass of hollow rubber bullets. These bullets are small balls and are made of a good quality of rubber. When inserted in the tire, they are in a vulcanizable condition and each contains a small quantity of a gas-producing agent, such as ammonium carbonate. When they are put into the tire, the latter is also uncured or vulcanizable. The tire is completely filled with the bullets, which are preferably spherical in form, so that very little space is left between them. Then the tire is spliced, as usual, and vulcanized in a mold in the usual manner, the heat also serving to vulcanize the bullets and to expand the volatile substance in the bullets. The latter are thus distended so as to fill completely the tire—that is, so that there are substantially no interstices between the bullets, the latter being pressed by one another into polyhedral and other forms. Thus each bullet has a permanent charge of gas under high compression and the conditions are such that there is practically no loss by leakage or otherwise. If the tire is punctured at any point, only one bullet is penetrated, and the reduction in the resiliency of the tire is hence wholly imperceptible. In fact, the tire may suffer scores of punctures and still retain a high and satisfactory degree of resiliency. I also provide means whereby loss occasioned by the punctured and collapsed bullets may be made good, and other features and advantages will hereinafter appear.

In the accompanying drawings, Figure 1 is a cross-section of a hose-pipe tire uncured or ready for vulcanizing and showing a mass of vulcanizable hollow soft-rubber bullets filling the tire, some of the bullets shown in section. Fig. 2 is a cross-section of the Fig. 1 tire after the latter is vulcanized. Fig. 3 is a cross-section similar to Fig. 1, but showing a vulcanizable detachable inner tube containing vulcanizable bullets. Fig. 4 shows a fragment of the Fig. 1 or Fig. 3 tire, showing an opening therein large enough for introduction of a bullet, said opening provided with a cap and the latter having also an inflation-valve. Fig. 5 shows the Fig. 3 article as vulcanized and inclosed in a "cover" or tubular rubber tread. Fig. 6 shows in section one of the cups from which the bullets are formed as seen at Fig. 1. Fig. 7 shows a variety of polyhedral forms assumed by the bullets as they are compacted together in the process of vulcanization. Fig. 8 shows a pair of cups. Fig. 9 shows a bullet with an outside layer or ply of fabric forming a reinforcing-jacket. Fig. 10 shows a cup having a lining of fabric. Fig. 11 shows a solid bullet of soft rubber.

In making a tire I first produce a large quantity of vulcanizable soft-rubber bullets 1. These may consist of cups 2 3, to whose edge is applied cement 4. The cups are unvulcanized, so that when they are placed together to form a bullet the latter when subjected to vulcanizing heat becomes a hermetically-sealed hollow soft-rubber body. The cups, however, may be partially cured after they are cemented together and before inserting within the tire, so as to set the joints or seams in the bullets. I insert within the cups before joining them small quantities of any suitable gas-producing agent 5, so that when the bullets are subjected to the heat of final vulcanization the soda is caused to assume a gaseous form and expand the ball much beyond its normal capacity. Each cup may be formed with a reinforcing ply or layer 6 of fibrous material, which may be applied to the outside of the ball, as at 7, Fig. 9, or it may be both inserted, as at Fig. 6, or placed outside, as at Fig. 9, and the outside layer may consist of windings of thread instead of weavings. It is also apparent that the reinforcing layer may be applied to the inside of the cups, as at 8, Fig. 10.

An unvulcanized hose-pipe tire 9 is formed in the usual manner and may have the usual windings or plies 10 of duck. Within this unvulcanized hose-pipe tire I insert hundreds of the rubber bullets 1, each of which is of far less diameter than the inside diameter of the tire, so that at any point in the tire the bullets will be found to lie or rest one upon another across the tire. I also preferably introduce into the tire a mass of loose or free powdered graphite 11 and a quantity of bicarbonate of soda 12. The tire thus prepared is placed within a suitable mold and subjected to vulcanizing heat. Both the bullets and the tubular tire are thereby completely vulcanized. The soda 5 within the bullets is changed to gaseous form and expands them much beyond their normal capacity, and they become closely compacted together, each being expanded as far as possible consistently with the pressure of the surrounding bullets, so that substantially the entire interior of the tube 9 is filled. The bullets are pressed by one another into irregular polyhedral shapes, as at Figs. 2, 5, and 7, and the gas in them is in a state of high compression. The loose gas-producing agent 12 in the tube 9 is also expanded into gaseous form and insures that at the completion of the molding operation the inside surface of the tube shall be smooth or without ridges. The graphite 11 is intended to be spread evenly over the bullets and the inside of the tire, so as to avoid chafing of the parts upon one another as the tire is flexed in use. The graphite is not changed by the heat of vulcanizing.

When the tire is in use, it possesses equal or superior resiliency to the ordinary pneumatic tire, and, if desired, the degree of compression of the gas within the bullets or polyhedral members may be far greater than practicable or convenient to attain in pneumatic tires.

Should puncture occur at any point in the tire, it will be seen that only the bullet or polyhedral member which is immediately at the point of puncture is penetrated or cut. Such bullet of course loses its charge of gas and collapses; but no appreciable effect is produced upon the tire as a whole, because the neighboring bullets all immediately expand and fill up the space of the punctured bullet. The loss of resiliency in the entire tube is therefore proportional to the ratio which the space occupied by the bullet bears to the entire space in the tube, and as there are preferably hundreds of bullets in the tube it will be seen that a puncture at any point means a reduction of only a small fraction of one per cent. of the pressure in the tube. Thus the tire may continue in use and may receive from time to time many punctures without detracting sensibly from its resiliency or usefulness, and in the natural course of events it will wear out before it receives enough punctures to render it undesirable.

The rubber used for the bullets is of a stock which is very dense or solid—that is, a compressed stock is used such that gas cannot leak through it. The rate of leakage through walls of the bullets would in any event be very slight, because each bullet is surrounded on all sides by a wall of rubber which tends to prevent the leakage, the pressure between the walls of each bullet and the adjoining walls being very great. Moreover, owing to the initial high pressure within the bullets there may be a substantial leakage of gas therefrom without reducing the resiliency of the tire to an undesirable point, and as such leakage would necessarily require a long time it follows that the life of the tire will not be reduced by mere leakage.

Preferably I provide the tire or tube with an opening 15 large enough to receive a bullet 1, said opening being in the form of a tube 16, normally closed by a screw-cap 17. Through this opening may be introduced solid soft-rubber bullets 18 or fabric-jacket balls, such as seen at Fig. 9, the latter containing gas in a state of high compression. As many of the balls, as seen at Fig. 9 or Fig. 11, may be forced into the tube 9 through the opening 15 as is desired from time to time to compensate for loss of pressure and resiliency due to numerous punctures. The tube 16 may be too small to accommodate the bullets 1, as it is only necessary for the tube to accommodate small bullets, any required number of which may be forced into the tube.

The invention applies not only to hose-pipe tires, (seen at Figs. 1 and 2,) but also to double-tube or detachable tires. At Fig. 3 is seen an inner tube 19 of soft rubber which is filled with balls 1 and is otherwise similar to the tubes seen at Fig. 1. This inner tube, with its contained bullets, may be cured in the manner already described, and in order to withstand the expanding pressure of the bullets the tube may be provided with one or more reinforcing layers or windings of duck 20 or any other suitable material. The tube may then be placed within the usual cover or tubular tread 21, having usual flanges 21$^a$ for attachment to a rim.

The devices 16 and 17 may be used upon the inner tube 19 for the purpose already described, and in this case the cap 17 may be provided with an ordinary inflation-valve 22, having the usual cap 23, which will be useful for inflation of the inner tube from time to time. This is an advantage, because even if the cover and inner tube are punctured there can escape only a small quantity air, since the tube is almost entirely filled with the bullets or polyhedral bodies, and these on account of their contained compressed gas prevent the tire from unduly deflating, and hence insure against accident. Hollow rubber balls may be used in this connection that have check-valves on the inside and are made of a simple compound of rubber or with a compound of rubber and cotton or other fabric to give the balls strength. These check-valve balls may be inserted in collapsed condition through the opening 15 and owing to their inherent springiness or tendency to assume their normal shape may draw in air from time to time as permitted by the neighboring balls or bullets, so that if many bullets become deflated their room will be taken up by these self-expanding balls, whose interior valves will prevent loss of air at any time.

Another method of replenishing the tire or tube is to insert a collapsed soft-rubber bullet, the latter provided with a hollow stem through which it may be inflated after the bullet is inserted in the tire. This bullet may be inflated to considerable extent and then the stem sealed in any suitable manner and as many bullets of this kind introduced and expanded and sealed as are found necessary.

All of the bullets may be made and vulcanized, each containing gas under pressure, and then inserted in the unvulcanized tube. In case the bullets when inserted in the tube are unvulcanized or partially vulcanized the amount of sulfur put in them or compounded with the rubber of which they are made will be of such quantity that their vulcanization will be completed when the tire itself is completely molded or vulcanized. In other words, the bullets would be neither undercured nor overcured.

Variations may be resorted to within the scope of my invention, and portions of my improvements may be used without others.

Having thus described my invention, I claim—

1. A tire comprising a flexible tube filled with a mass of hollow soft-rubber bullets each containing gas in a state of high compression, whereby each bullet is distended to such an extent that it conforms throughout to the adjoining bullets or wall of the tube, the gas in each bullet being capable of expanding the bullet far beyond its normal capacity when the bullet is released from confinement.

2. A tire comprising a flexible tube, and means for filling the same, said filling means comprising a large mass of soft-rubber bullets distended to abnormal forms, the diameter of each of which is materially less than the diameter of the cross-section of the tube, so that at any point in the tube several bullets lie one upon another across the tube; each bullet containing gas in a state of high compression capable of still further expanding the same, such further expansion being restrained by adjoining bullets and the wall of the tube; so that when any bullet collapses through puncture, the remaining bullets may expand to occupy the room of the collapsed bullet.

3. A flexible tire tightly filled with polyhedral units of soft distensible rubber each containing gas in a state of high compression, said units being relatively small so that a large number of them lie side to side in a cross-section of the tire, and independent of one another so that when one or more units collapse through puncture, the remaining mass of units may expand and take up the room of the collapsed unit or units.

4. A tire comprising a flexible tube filled with a mass of hundreds of hollow sealed soft-rubber bullets each distended and distorted by gas to greater than its normal capacity; the gas in each bullet capable of further distending the same; said bullets closely compacted together and supporting one another against any further distension.

5. A tire comprising a flexible tube containing a mass of hermetically-sealed hollow soft-rubber bullets which are distended with gas, distorted by the gas, and closely compacted together, each of said bullets expanded beyond its normal capacity.

6. A tire comprising a flexible tube filled with a mass of unconnected bodies of such small size that a large number of them lie side to side in a cross-section of the tube, said bodies each containing gas in a state of high compression and capable of expanding the body, but the bodies sustained by one another against such expansion; lubricating means being provided between said bodies and also between the tube and the bodies.

7. A tire comprising an air-tight flexible rubber tube containing a mass of distended soft-rubber bullets, and having an opening through which more bullets may be inserted; said opening provided with an air-tight removable cap; and a inflation-valve provided upon said cap.

FRANK A. MAGOWAN.

Witnesses:
B. C. STICKNEY,
BERTHA SCHNIER.